United States Patent [19]

Furuno

[11] Patent Number: 5,287,554
[45] Date of Patent: Feb. 15, 1994

[54] PORTABLE RADIO COMMUNICATION EQUIPMENT

[75] Inventor: Kenichi Furuno, Amagasaki, Japan

[73] Assignee: Mitsubishi Denki Kabushiki Kaisha, Tokyo, Japan

[21] Appl. No.: 747,962

[22] Filed: Aug. 21, 1991

[30] Foreign Application Priority Data

Aug. 24, 1990 [JP] Japan ............... 2-88731[U]

[51] Int. Cl.⁵ .................................. H04B 1/38
[52] U.S. Cl. ............................ 455/89; 455/90; 455/95; 455/127; 455/128; 455/343; 455/348; 379/433; 379/434
[58] Field of Search ............ 455/89, 90, 95, 127, 455/128, 343, 348; 307/150; 379/428, 433, 434

[56] References Cited

U.S. PATENT DOCUMENTS 4,578,628 3/1986 Siwiak .................... 455/89

FOREIGN PATENT DOCUMENTS

| 018940 | 4/1980 | European Pat. Off. |
| 0445808 | 8/1991 | European Pat. Off. ........... 455/89 |
| 0160733 | 8/1985 | Japan ........................... 455/89 |
| 160733 | 8/1985 | Japan. |
| 8733 | 1/1989 | Japan. |
| 15441 | 1/1989 | Japan. |
| 8702848 | 5/1987 | PCT Int'l Appl. |

OTHER PUBLICATIONS

Mitsubishi Model 3000, copyright Jan. 1, 1991.

Primary Examiner—Reinhard J. Eisenzopf
Assistant Examiner—Andrew Faile
Attorney, Agent, or Firm—Rothwell, Figg, Ernst & Kurz

[57] ABSTRACT

In a portable radio equipment, a first power unit (11) and a second power unit (15) can be selectively mounted to or removed from a radio equipment main unit (1). The main unit contains a transmit audio circuit (3), a first microphone (4), and a power circuit (5). When the first power unit is mounted to the main unit, a short-circuiting member (12) in it connects the first microphone to the transmit audio circuit, and a power source (8A) in it provides power to the power circuit. When the second power unit (15) is mounted to the main unit (1), a second microphone (16) in it is connected to the transmit audio circuit to the main unit, and a power source (8B) provides power to the power circuit.

8 Claims, 3 Drawing Sheets

5,287,554

PORTABLE RADIO COMMUNICATION EQUIPMENT

FIELD OF THE INVENTION

The present invention relates to a portable radio equipment having a removable power unit.

DESCRIPTION OF THE BACKGROUND ART

FIG. 5 is a configuration diagram showing a prior-art portable radio equipment. As illustrated, the portable radio equipment comprises a radio equipment main unit 1 and a power unit 2 which is configured so that it can be mounted to and removed from the main unit 1.

The main unit 1 contains a transmit audio circuit 3 modulating a transmit speech signal and sending it to a transmitter section, not shown. A microphone 4 is provided to receive transmit speech. A power circuit 5 receives power supply and distributing it within the main unit 1. The main unit 1 has a power supply terminal 6 and a ground terminal 7.

The power unit 2 contains a battery 8 serving as a power source providing power to the power circuit 5 of the main unit 1. A positive terminal 9 is connected to the power supply terminal 6 when the power unit 2 is mounted to the main unit 1. A negative terminal 10 is connected to the ground terminal 7 when the power unit 2 is mounted to the main unit 1.

The operation will now be described. When the power unit 2 is mounted to the main unit 1, the positive terminal 9 and the negative terminals 10 of the power unit 2 are respectively connected to the power supply terminal 6 and the ground terminal 7 of the main unit 1. Power is thereby supplied from the battery 8 in the power unit 2 to the power circuit 5 in the main unit 1, and the portable radio equipment is ready to operate.

In this state, when the portable radio equipment is turned on and it is brought to a connected state in which communication link has been established and speech communication is possible, the microphone 4 receives transmit speech of the user or the operator, and inputs it to the transmit audio circuit 3. The transmit audio circuit 3 modulates the speech signal and sends the modulated signal to the transmitter section.

Since the prior-art radio equipment is configured as described above, size reduction of the radio equipment is accompanied with size reduction of the main unit 1, and the distance between the microphone 4 and an ear piece (earphone), not shown, is decreased, so that user feels uneasy in using the radio equipment.

SUMMARY OF THE INVENTION

The present invention has been made to solve the problems described above, and its object is to enable the distance between the microphone and the ear piece to be changed and to eliminate the uneasiness in use of the radio equipment.

In a portable radio equipment according to the present invention, the power unit which can be mounted to and removed from the main unit is in the form of a first power unit having a power source and a short-circuiting member for connecting the first microphone of the radio equipment main unit to the transmit audio circuit, and a second power unit having a power source and a second microphone connected to the transmit audio circuit in the main unit, and the first and the second power units are selectively used depending on the circumstance.

With the portable radio equipment according to the invention, where the size reduction is of a primary importance, the first power unit is mounted to the main unit, and the first microphone which is built in is connected to the transmit audio circuit in the main unit, while where the facility in use is of a primary importance, the second power unit is mounted to the main unit, and the second microphone within the second power unit is connected to the transmit audio circuit in the main unit. In this way, the distance between the microphone and the ear piece can be modified, and the uneasiness felt by the user during operation is eliminated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1A:
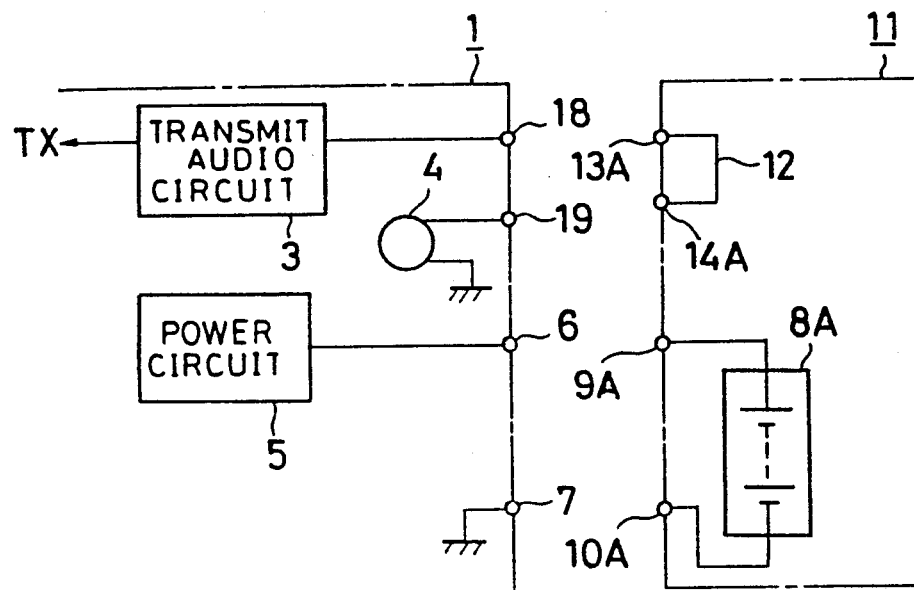
FIG. 1A and FIG. 1B are circuit diagrams showing a portable radio equipment according to an embodiment of the invention.
Figure 1B:
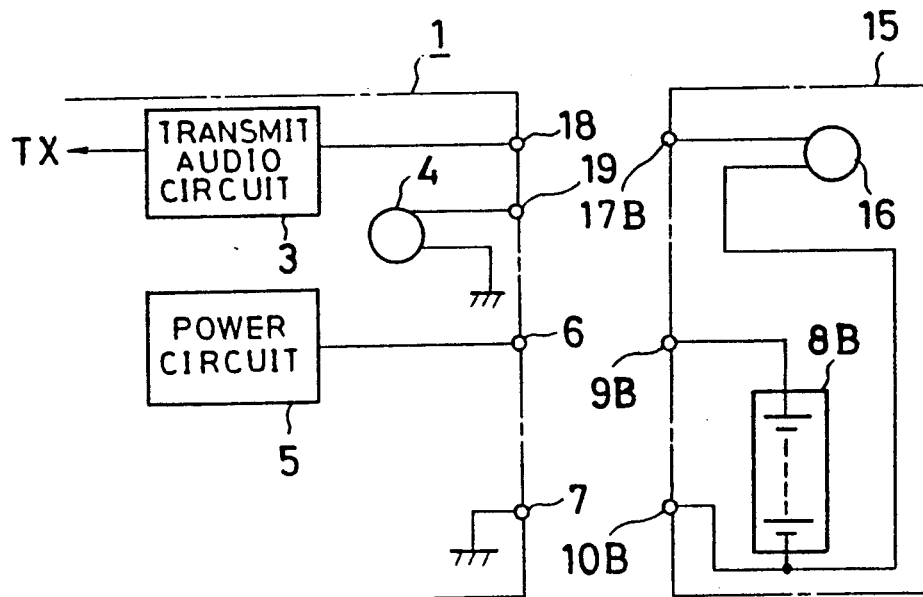
Figure 2A:
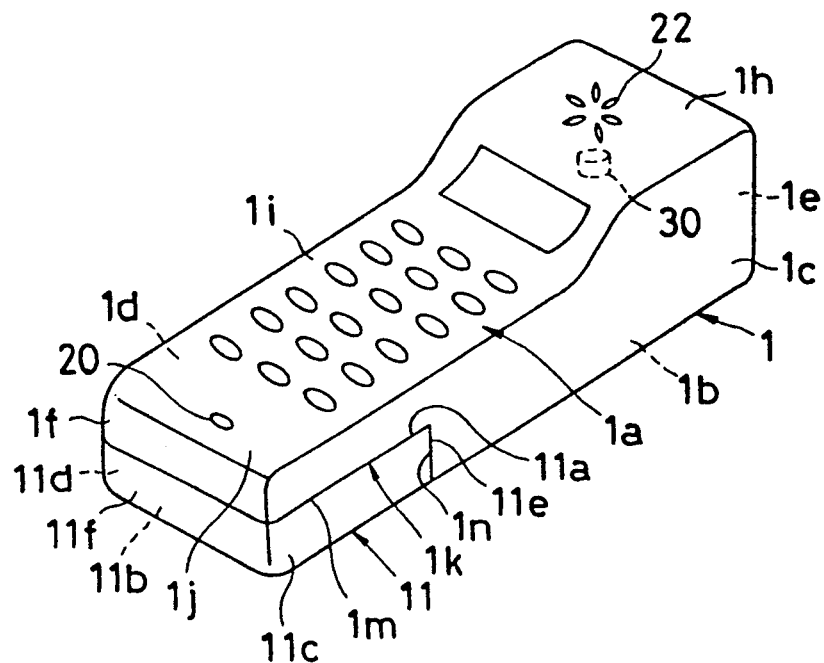
FIG. 2A and FIG. 2B are external views.
Figure 2B:
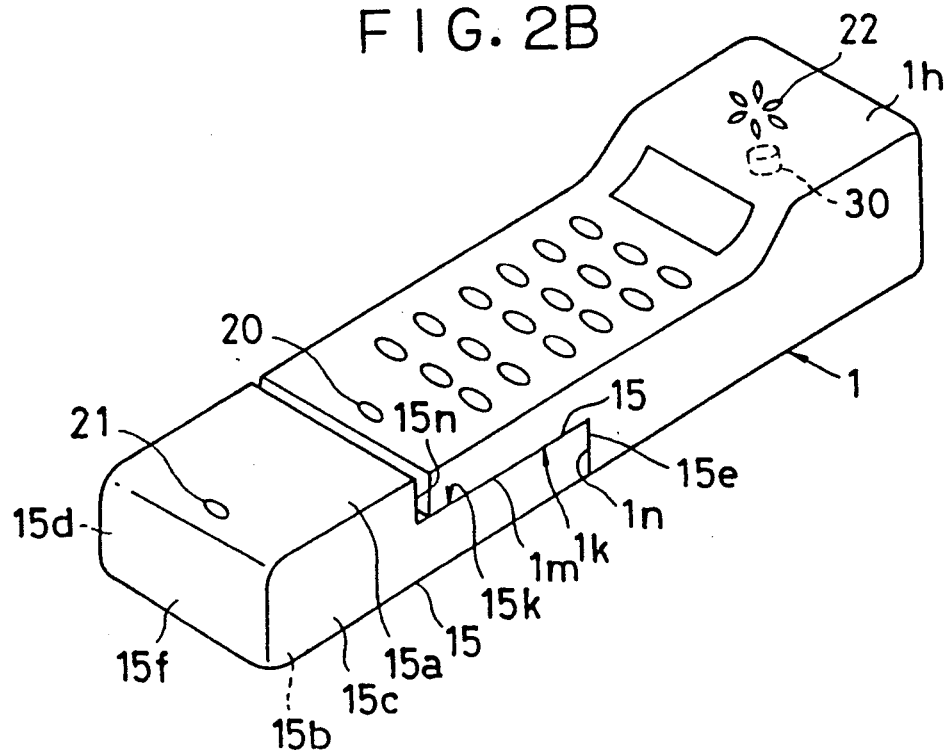

An embodiment of the invention will now be described with reference to figures. FIG. 1A and FIG. 1B are circuit diagrams showing a portable radio equipment according to an embodiment of the invention. FIG. 2A and FIG. 2B are external views thereof. FIG. 1A and FIG. 2A show a case in which a first power unit is mounted to the radio equipment main unit, and FIG. 1B and FIG. 2B show a case in which a second power unit is mounted to the main unit.

Figure 5:
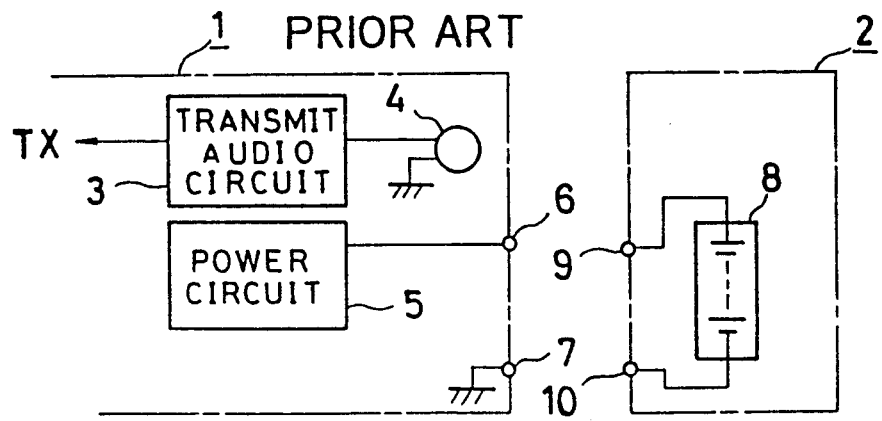
FIG. 5 is a circuit diagram showing a conventional portable radio equipment.

In these figures, members identical or corresponding to those in FIG. 5 are given identical reference numerals, and their description is omitted.

In the respective figures, a portable radio equipment comprises a main unit 1 containing a transmit audio circuit 3, a first microphone 4, a power circuit 5, a power terminal 6 and a ground terminal 7.

The portable radio equipment further comprises a first power unit 11 so configured that it can be mounted to and removed from the main unit 1. The first power unit contains a battery 8A used as a power source, a positive terminal 9A, a negative terminal 10A, a short-circuiting member 12 disposed in the first power unit 11, and connecting the first microphone 4 to the transmit audio circuit 3 when the first power unit 11 is mounted to the main unit 1. The first power unit 11 further comprises terminals 13A and 14A connected to the short-circuiting member 12. The first power unit 11 differs from the conventional power unit 2 in that it has the short-circuiting member 12 and the terminals 13A and 14A.

The portable radio equipment further comprises a second power unit 15 so configured that it can be mounted to and removed from the main unit 1. The second power unit 15 contains a battery 8B used as a power source, a second microphone 16 disposed in the second power unit 15 and connected to the transmit audio circuit 3 when the second power unit 15 is mounted to the main unit 1. The second power unit 15 further comprises a terminal 17B connected to the second microphone 16. The second power unit 15 differs from the conventional power unit 2 in that it has the second microphone 16 and the terminal 17B.

The main unit 1 further comprises a terminal 18 connected to the input of the transmit audio circuit 3 in the main unit 1, and connected to the terminal 13A when the first power unit 11 is mounted and connected to the terminal 17B when the second power unit 15 is mounted. The main unit 1 further comprises a terminal 19 which is connected to the first microphone 4, and which is connected to the terminal 14A when the first power unit 11 is mounted, and which is made open or floating when the second power unit 15 is mounted. The main unit 1 differs from the conventional one in that the transmit audio circuit 3 and the first microphone 4 are connected to the respective terminals 18 or 19, and not connected directly.

Referring now to FIG. 2A and FIG. 2B, the main unit 1 is has a generally rectangular housing, and having a generally flat front surface 1a, a generally flat rear surface 1b parallel with opposite to the front surface 1a, a pair of generally flat side surfaces 1c (being on the side seen) and 1d (being on the side not seen) which connect the front and the rear surfaces 1a and 1b, and are orthogonal to the front and the rear surfaces 1a and 1b, and are parallel with and opposite to each other. The main unit 1 further has a generally flat top surface 1e orthogonal to the front, the rear and the side surfaces 1a to 1d and connecting them together. The main unit 1 further has a bottom surface 1f which is parallel with the top surface 1e.

The front surface 1a has an elevated part 1h near the edge of the top surface 1e, and the elevated part 1h is provided with an opening 22 communicating with a ear piece 30 contained in the housing of the main unit 1.

The front surface 1a also has a central part 1i where numerical keys and function keys conventionally provided on a portable radio equipment are provided.

The front surface 1a also has a bottom part 1j near the edge of the bottom surface 1f where another opening 20 for communication with the first microphone 4 (FIG. 1A, FIG. 1B) contained in the housing of the main unit 1 is provided.

The part near the edge joining the rear surface 1b and the bottom surface 1f is cut away to form a cut-away portion 1k defined by an indented rear surface part 1m and an intended bottom surface part 1n. The terminals 6, 7, 18 and 19 in FIG. 1A and FIG. 1B are provided on the indented rear surface part 1m or the indented bottom surface part 1n. When the first power unit 11 or the second power unit 15 is mounted to the main unit 1, it is fitted (entirely or partially) in the cut-away portion 1k.

The first power unit 11 also has a generally rectangular housing and has a front surface 11a and a rear surface 11b parallel with and opposite to each other, side surfaces 11c and 11d connecting the front and the rear surfaces 11a and 11b, parallel with and opposite to each other and orthogonal to the front surface 11a and the rear surface 11b, a top surface 11e and a bottom surface 11f parallel with and opposite to each other, and orthogonal to the front, the rear and the side surfaces 11a to 11d. The terminals 9A, 10A, 13A and 14A in FIG. 1A are provided on the front surface 11a or the top surface 11e.

When, the first power unit 11 is mounted to the main unit 1, it is fitted in the cut-away portion 1k, the front surface 11a is in abutment with the indented rear surface part 1k and the top surface 11e is in abutment with the indented bottom surface 1n, the rear surface 11b, the side surfaces 11c and 11d and the bottom surface 11f are substantially flush with the rear surface 1b, the side surfaces 1c and 1d and the bottom surface 1f, and the terminal 9A, 10A, 13A and 14A on the first power unit 11 are brought into contact with the terminals 6, 7, 18 and 19 to establish electrical connection.

The second power unit 15 also has a generally rectangular housing and has a front surface 15a and a rear surface 15b parallel with and opposite to each other, side surfaces 15c and 15d connecting the front and the rear surfaces 15a and 15b, parallel with and opposite to each other and orthogonal to the front surface 15a and the rear surface 15b, a top surface 15e and a bottom surface 15f parallel with and opposite to each other, and orthogonal to the front, the rear and the side surfaces 15a to 15d.

The part near the edge joining the front surface 15a and the top surface 15e is cut away to form a cut-away portion 15k defined by an indented front surface part 15m and an intended bottom surface part 15n. The terminals 9B, 10B and 17B in FIG. 1B are provided on the indented front surface part 15m or the indented top surface part 15e.

When, the second power unit 15 is mounted to the main unit 1, part near the top surface 15e, forming a projection, is fitted in the cut-away portion 1k, the indented front surface part 15m is in abutment with the indented rear surface part 1k and the top surface 15e is in abutment with the indented bottom surface 1n, and the indented top surface 15n is proximate to the bottom surface 1f, and the front surface 15a, the rear surface 15b and the side surfaces 15c and 15d are substantially flush with the front surface 1a, the rear surface 1b and the side surfaces 1c and 1d, and the terminal 9B, 10B and 17B on the second power unit 15 are brought into contact with the terminals 6, 7 and 18 to establish electrical connection. The terminal 19 on the main unit 1 is not connected and is open, so that the first microphone 4 is disconnected.

Provided on the front surface 15a of the second power unit 15, near the edge of the bottom surface 15f, is an opening 21 communicated with the second microphone 16 contained in the second main unit 15.

As will be seen, the distance between the opening 22 and the opening 21 is greater than the distance between the opening 22 and the opening 20, and it is easier in use if the second power unit 15 is mounted to the main unit 1 and the second microphone 16 communicated with the opening 21 is operative.

The operation will now be described. When the first power unit 11 is mounted to the main unit 1, as in the conventional arrangement, the power terminal 6 and the ground terminal 7 of the main unit 1 are connected to the positive terminal 9A and the negative terminal 10A of the power unit 2, and the terminals 18 and 19 of the main unit 1 are connected to the terminals 13A and 14A of the first power unit 11. As a result, the power circuit 5 is fed from the battery 8A, and the first microphone 4 is connected via the short-circuiting member 12 to the transmit audio circuit 3, and the portable radio equipment is in a state in which it can be used.

In the state in which use is possible, if the portable radio equipment is turned on, and is brought to a connected state, as in the prior art, the transmit speech from the first microphone 4 is entered into the transmit audio circuit 3, which modulates the transmit speech signal and sends the modulated signal to the transmitter section.

The advantage in the use of the first power unit is that the size of the entire equipment is small.

When the second power unit 15 is mounted to the main unit 1, the second microphone 16 within the second power unit 15 is connected via the terminals 17B and 18 to the transmit audio circuit 3 within the main unit 1. The first microphone 4 is then open at the terminal 19 and is in a state in which it cannot be used. Connected to the power terminal 6 and the ground terminal 7 of the main unit 1 are the positive terminal 9B and the negative terminal 10B of the second power unit 15, so the power circuit 5 in the main unit 1 is fed from the battery 8B, and the portable radio equipment is in a state in which it can be used.

If, in this state, the portable radio equipment is turned on and is brought to a connected state, the second microphone 16 receives the transmit speech of the user, which is then sent via the terminals 17B and 18 to the transmit audio terminal 3, and is sent to the transmitter section.

The advantage in the use of the second power supply is that the distance between the opening 21 for the second microphone and the opening 22 for the ear piece 30 is greater and can optimized to facilitate the use of the equipment.

Figure 3:
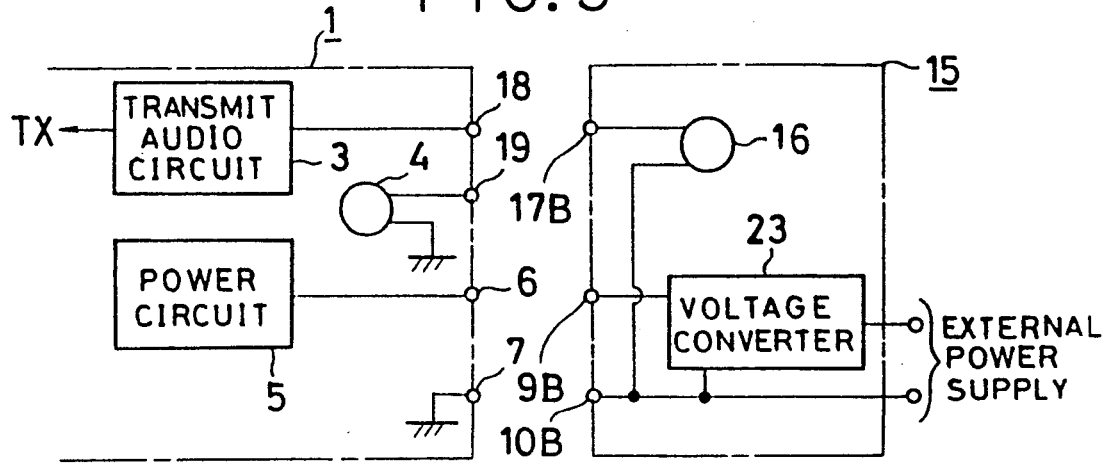
FIG. 3 and FIG. 4 are circuit diagrams showing other embodiments of the invention.

In the above embodiment, a battery is used as the power source, but power unit may be of such a construction which can be connected to an external power supply, e.g., from an mobile power supply, and has a voltage converter receiving the external power supply and producing a power of a desired voltage. FIG. 3 shows such an embodiment. In the figure, a voltage converter 23 is used as a power source, and converts the voltage of an external power supply into the voltage corresponding to the output of the battery in the above embodiment, and provides the output across the positive terminal 9B and the negative terminal 10B. In FIG. 3, only the second power unit 15 is shown, but the first power unit 11 may be configured similarly.

Figure 4:
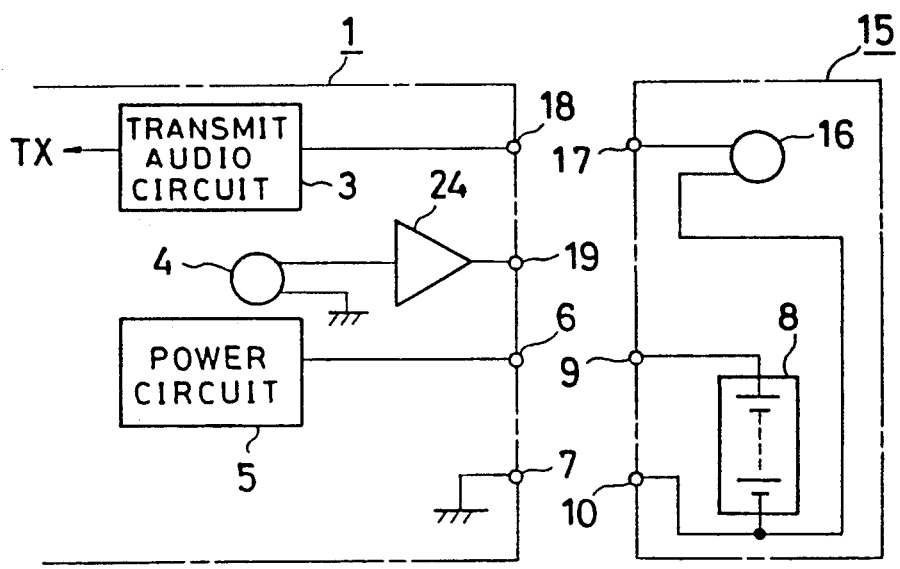

In the above embodiment, the microphone 4 and the terminal 19 in the main unit 1 are connected directly. But an amplifier for adjusting the speech level may be inserted. FIG. 4 shows such an embodiment. In the figure, an amplifier 24 is inserted for adjusting the speech level. By inserting the amplifier 24, any difference in the speech output level due to the difference between the distance from the mouth of the user to the first microphone 4 and the distance from the mouth of the user to the second microphone 16 can be compensated for, and the level of the input to the transmit audio circuit 3 can be made unchanged despite the difference between the distance from the mouth of the user to the first microphone and the distance from the mouth of the user to the second microphone.

Similarly, other terminals and the parts inside the housings of the main unit 1, the first power unit 11 and the second power unit 15 may be connected indirectly, via members not shown.

As has been described, according to the invention, the first power unit having the short-circuiting member for connecting the first microphone to the transmit audio circuit, and the second power unit having the second microphone connected to the transmit audio circuit are provided, and are used selectively depending on the particular circumstance. Where the size reduction is of a primary importance, the first power unit can be mounted, while where the facility in use is of a primary importance, the second power unit can be mounted. The distance between the microphone and the ear piece can be changed depending to suite the preference of the user, and the uneasiness in use can be eliminated.

What is claimed is:

1. A portable radio equipment, comprising:
    a radio equipment main unit (1) containing
        a transmit audio circuit (3) modulating a transmission speech signal and sending it to a transmitter section;
        a first microphone (4) into which speech is input for generating the transmission speech signal; and
        a power circuit (5) receiving power and distributing the power within the main unit;
    a first power unit (11) structured so that it can be mounted to and removed from the radio equipment main unit, and containing
        a short-circuiting member (12) connecting, when said first power unit is mounted to the radio equipment main unit, said first microphone to said transmit audio circuit; and
        a power source (8A) providing, when said first power unit is mounted to the radio equipment main unit, power to said power circuit; and
    a second power unit (15) structured so that it can be mounted to and removed from said radio equipment main unit, and containing
        a second microphone (16) for generating said transmission speech signal in response to inputted speech, connected to said transmit audio circuit when said second power unit is mounted to said radio equipment main unit, and a power source (8B) providing power to said power circuit, when said second power unit is mounted to the radio equipment main unit;
    each of said first power unit and said second power unit being selectively mountable to said radio equipment main unit to the exclusion of the other power unit.

2. The equipment as set forth in claim 1, wherein the second power unit is larger in size than the first power unit, the main unit has a housing having a first opening (22) communicating with an ear piece (30) contained in the housing of the main unit and a second opening (20) communicating with the first microphone, and the second power unit has a housing having a third opening (21) communicating with the second microphone within the housing of said second power unit, and the distance between the first opening and the third opening with the second power unit being mounted to the main unit is larger than the distance between the first and the second openings.

3. The equipment as set forth in claim 2, wherein the distance between the first and the third openings with the second power unit being mounted to the main unit is optimized for input of speech into the second microphone and listening from the ear piece.

4. The equipment as set forth in claim 3, wherein the distance between the first and the third openings with the second power unit being mounted to the main unit is determined so that when the first opening is near the ear of a user and the third opening is near the mouth of the user.

5. The equipment as set forth in claim 1, wherein said main unit includes:
   a first terminal (6) coupled to the power circuit,
   a second terminal (7) coupled to ground,
   a third terminal (18) coupled to the transmit audio circuit and
   a fourth terminal (19) coupled to the first microphone said first power unit includes:
   a fifth terminal (9A) and a sixth terminal (10A) coupled to a first electrode and a second electrode of the power source (8A), and
   a seventh terminal (13A) and an eighth terminal (14A) coupled with each other by said short-circuiting member; and said second power unit includes:
   a ninth terminal (9B) and a tenth terminal (10B) coupled to a first electrode and a second electrode of the power source (8B, 23), and
   an eleventh terminal (17B) coupled to said second microphone (16);
   such that when said first power unit is mounted to said main unit said fifth, sixth, seventh, and eighth terminals are respectively connected to said first, second, third and fourth terminals, and when said second power unit is mounted to said main unit said ninth, tenth and eleventh terminals are respectively connected to said first, second and third terminals.

6. The equipment as set forth in claim 5, wherein said first microphone (4) is coupled to said fourth terminal (19) through an amplifier (24) for adjusting the level of the signal to compensate for the difference between the distance from the mouth of the user to the first microphone and the distance from the mouth of the user to the second microphone.

7. The equipment as set forth in claim 5, wherein said first microphone (4) is coupled to said fourth terminal (19) through an amplifier (24) for adjusting the level of the signal so that the level of the signal as applied to said transmit audio circuit (5) from said first microphone (4) is substantially equal to the level of the signal as applied to the said transmit audio circuit (5) from said second microphone (16) despite the difference between the distance from the mouth of the user to the first microphone and the distance from the mouth of the user to the second microphone.

8. Portable radio communication equipment, comprising:
   a main unit, including
      transmit audio circuit means for modulating an inputted audio signal and outputting a modulated audio signal to a transmitter section,
      a first microphone for generating said inputted audio signal,
      a power circuit for receiving power from a power source and distributing said power within said main unit, and
      means for coupling a power unit to said main unit;
   a first power unit removably mountable to said main unit through said means for coupling, including
      short-circuiting means for connecting said first microphone to said transmit audio circuit means when said first power unit is mounted to said main unit, and
      a first power source for providing power to said power circuit when said first power unit is mounted to said main unit; and
   a second power unit removably mountable to said main unit through said means for coupling, including
      a second microphone for generating the audio signal and being connected to said transmit audio circuit means when said second power unit is mounted to said main unit, and
      a second power source for providing power to said power circuit when said second power unit is mounted to said main unit.

* * * * *